United States Patent
Lugg et al.

Patent Number: 6,144,479
Date of Patent: *Nov. 7, 2000

[54] LOW REFLECTIVITY CONTRAST ENHANCEMENT FILTER

[75] Inventors: Paul S. Lugg; Kenton D. Budd, both of Woodbury; John E. Bailey, Edina; Matthew H. Frey, Maplewood; Scott G. Theirl, Stillwater, all of Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/212,945

[22] Filed: Dec. 16, 1998

[51] Int. Cl.$^7$ .............................. G02F 1/153; G02B 1/10; G02B 5/22; H04N 5/72

[52] U.S. Cl. .................. 359/267; 359/614; 359/888; 359/275; 359/586; 359/588; 348/817; 348/834; 348/835

[58] Field of Search ..................... 359/265, 267, 359/268, 275, 586, 588, 609, 614, 888, 892; 348/817, 834, 835

[56] References Cited

U.S. PATENT DOCUMENTS

| | | | |
|---|---|---|---|
| 3,432,225 | 3/1969 | Rock | 359/588 |
| 3,518,373 | 6/1970 | Cushera et al. | 348/834 |
| 3,708,622 | 1/1973 | Brown . | |
| 3,736,050 | 5/1973 | Bolum | 359/890 |
| 3,858,965 | 1/1975 | Sumita | 359/588 |
| 3,879,627 | 4/1975 | Robinder | 359/888 |
| 4,132,919 | 1/1979 | Maple | 359/589 |
| 4,245,242 | 1/1981 | Trcka | 348/816 |
| 4,338,000 | 7/1982 | Kamimori et al. | 359/275 |
| 4,599,535 | 7/1986 | Toch | 348/835 |
| 4,663,562 | 5/1987 | Miller et al. . | |
| 4,747,674 | 5/1988 | Butterfield et al. | 359/590 |

(List continued on next page.)

FOREIGN PATENT DOCUMENTS

| | | |
|---|---|---|
| 33 12 362 | 7/1984 | Germany . |
| WO 91/08106 | 6/1991 | WIPO . |
| WO 94/15247 | 7/1994 | WIPO . |
| WO 95/34088 | 12/1995 | WIPO . |
| WO 98/48440 | 10/1998 | WIPO . |

OTHER PUBLICATIONS

"Monolithic Solid State Electrochromic Coatings for Window Applications"; S.P. Sapers et al.; 1996 Society of Vacuum Coaters, 39$^{th}$ Annual Technical Conference Proceedings; pp. 248–255.

"Electrochromic Window With Lithium Conductive Polymer Electrolyte"; Paul Baudry et al.; Proceedings of the Symposium on Electrochromic Materials, vol. 90–2 1990 pp. 274–287.

"Anti–Reflection Coatings"; Viratec Thin Films, Inc.; Apr. 1996.

"Electrochromic Display for Indicating the Focus Sensing Area of the Camera Finder"; Ishikawa et al.; Technology Report, vol. 60, No. 5 1997, pp. 303–306.

"Optics: A Short Course for Engineers & Scientists", Williams and Becklund; Wiley–Interscience, 1972, pp. 85–86.

(List continued on next page.)

*Primary Examiner*—Georgia Epps
*Assistant Examiner*—Evelyn A. Lester
*Attorney, Agent, or Firm*—Scott R. Pribnow

[57] ABSTRACT

A low reflectivity, variable attenuation contrast enhancement filter having a total visible light reflectance of less than about 2.0% when measured with light incident to the first outer major surface. The contrast enhancement filter has a first layer(s) for providing antireflection, the first layer(s) defining the first outer major surface; a variable attenuation element interposed between the first major outer surface and the second major outer surface; element(s) for providing fixed attenuation interposed between the variable attenuation element and the first major outer surface; and at least one substrate.

30 Claims, 7 Drawing Sheets

U.S. PATENT DOCUMENTS

| | | | |
|---|---|---|---|
| 4,804,883 | 2/1989 | Müller et al. | 348/834 |
| 4,846,551 | 7/1989 | Rancourt et al. | 359/589 |
| 4,989,953 | 2/1991 | Kirschner | 359/888 |
| 5,018,833 | 5/1991 | Bennett et al. | 359/888 |
| 5,091,244 | 2/1992 | Biornard | 428/216 |
| 5,105,310 | 4/1992 | Dickey | 359/586 |
| 5,239,406 | 8/1993 | Lynam | 359/275 |
| 5,270,858 | 12/1993 | Dickey | 359/586 |
| 5,362,552 | 11/1994 | Austin | 359/588 |
| 5,407,733 | 4/1995 | Bjornard et al. | 359/589 |
| 5,450,238 | 9/1995 | Bjornard et al. | 359/580 |
| 5,461,506 | 10/1995 | Check, III et al. | 359/296 |
| 5,463,491 | 10/1995 | Check, III | 359/296 |
| 5,467,217 | 11/1995 | Check, III et al. | 359/296 |
| 5,521,759 | 5/1996 | Dobrowolski et al. | 359/585 |
| 5,521,765 | 5/1996 | Wolfe | 359/885 |
| 5,699,192 | 12/1997 | Van Dine et al. | 359/269 |
| 5,715,103 | 2/1998 | Amano et al. | 359/888 |
| 5,719,705 | 2/1998 | Machol | 359/581 |
| 5,724,177 | 3/1998 | Ellis, Jr. et al. | 359/273 |
| 5,772,978 | 6/1998 | Bailey et al. | 423/606 |
| 5,777,780 | 7/1998 | Terada et al. | 359/273 |
| 5,808,778 | 9/1998 | Bauer et al. | 359/267 |
| 5,825,526 | 10/1998 | Bommarito et al. | 359/265 |
| 5,831,760 | 11/1998 | Hashimoto et al. | 359/273 |
| 5,852,513 | 12/1998 | McDole et al. | 359/588 |
| 5,959,762 | 6/1970 | Bandettini et al. | 359/265 |

OTHER PUBLICATIONS

"Electrochromism: Fundamentals and Applications"; Monk, et al.; VCH Publications, 1995; pp. 8–11. 43–75.

"Modern Optical Engineering The Design of Optical Systems"; Warren J. Smith; McGraw–Hill Book Company; 1966; pp. 167–175.

LOW REFLECTIVITY CONTRAST ENHANCEMENT FILTER

BACKGROUND

Contrast enhancement filters having neutral density over the visible spectrum are known to enhance the contrast of self-luminous electronic displays (e.g., cathode ray tubes or CRTs) which often suffer from loss of contrast when viewed in bright ambient light. By placing a contrast enhancement filter between the viewer and the display, light reflected off the face of the CRT passes through the contrast enhancement filter twice whereas light emitted by the CRT passes through the optical filter only once. As a result, the contrast enhancement filter reduces the intensity of the reflected light relative to the intensity of the light emitted by the CRT thereby enhancing the contrast of the display.

When displays are viewed under varying conditions of ambient light, variable density contrast enhancement filters are useful since the ability to vary the density of the filter allows the user to control the contrast enhancement and glare reduction provided by the filter in response to prevailing lighting conditions and the user's personal taste. Under low glare conditions (e.g., low levels of ambient light), it may be desirable to have a low absorption, high transmission contrast enhancement filter in order to provide truer display color, longer life of the display, and increased brightness. Under high glare conditions, it may be desirable to have a high absorption, low transmission contrast enhancement filter to provide enhanced contrast and reduced glare.

Devices useful as variable transmission filters or attenuators are known in the art. Although the ability to vary the optical density of the device in response to changing ambient lighting conditions would be expected to produce improvement in display readability over that produced by fixed density filters, such variable density devices have a number of shortcomings which lead to disappointing performance. A particularly critical property of displays and display filters is total reflectivity. Although contrast is readily enhanced by attenuators of many types, extremely low reflectivity is required to avoid eye strain and distraction that results from specular and other reflection. User controllable variable transmission devices known in the art result in undesirably high levels of total reflectivity because of the large number of materials, layers, and interfaces present.

For example, a variable density contrast enhancement filter may be provided by an electrochromic device which changes its optical properties upon application of an electric current or potential. U.S. Pat. No. 4,338,000 (Kamimori et al.) reports a variable density electrochromic contrast enhancement filter which can be used as a cover glass panel for a television. PCT published application WO/96/34088 reports an electrochromic device for a cathode ray tube which employs an ambient light sensor to control the attenuation of the device to provide a constant level of contrast. The electrochromic devices typically have a multilayer structure including a layer of an electrically conductive material, an electrode formed from a layer of an electrochromic material, an ion conductive layer, a counterelectrode, and another electrically conductive layer. The large number of interfaces between layers having different refractive indices may lead to a high cumulative level of reflectivity, thereby reducing the amount of light which the device is capable of transmitting and producing less than expected glare reduction.

Other examples of variable transmission devices are known in the art. Devices comprising electroactive chromophores and an electrolyte solution are reported in U.S. Pat. No. 5,801,873 (Byker) and U.S. Pat. No. 5,808,778 (Bauer et al.). Devices comprising suspended particle technology are reported in U.S. Pat. Nos. 1,955,923 (Land) and U.S. Pat. No. 5,130,057 (Saxe). Suspended polyiodide particles are aligned by an electric field in order to increase optical transmission, and allowed to relax in the absence of a field to provide decreased transmission. A monolithic electrochromic device comprising sequentially deposited layers of oxide coatings is disclosed in U.S. Pat. No. 5,404,244 (VanDine et al.). All of these devices produce reflected light from their various components, multiple interfaces, and front and rear surfaces.

Moreover, when variable density filters are used, it is desirable for the variable density portion of the filter not to interfere with other functions typically performed by display filters, such as EM shielding, electrostatic charge dissipation, and front surface antireflection, so that the advantages of these highly useful multifunctional filters can be retained.

In view of the foregoing, a variable transmission contrast enhancement filter having reduced reflectivity is desired.

SUMMARY

The present invention provides variable attenuation (i.e., variable transmission) contrast enhancement filters having a total visible light reflectance which is less than about 2.0%. More preferably, the total visible light reflectance is less than about 1.5% and most preferably less than about 1.0%.

A contrast enhancement filter of the present invention is typically positioned between a viewer and a display (e.g., a CRT display) to provide contrast enhancement of the display under various lighting conditions. Optionally, a contrast enhancement filter of the present invention may be affixed directly to the display.

In a first aspect, the contrast enhancement filter includes:
(i) a first means for providing antireflection, the first means defining the first outer surface of the filter;
(ii) a variable attenuation element interposed between the first means for providing antireflection and the second outer surface;
(iii) means for providing fixed attenuation interposed between the variable attenuation element and the first outer surface; and
(iv) at least one substrate.

In a second aspect, the contrast enhancement filter includes:
(i) a first means for providing antireflection, the first means defining the first outer surface of the filter;
(ii) a variable attenuation element interposed between the first means for providing antireflection and the second outer surface of the filter, the variable attenuation element having index-matched layers; and
(iii) at least one substrate.

In a preferred embodiment, a second means for providing antireflection is provided which defines the second outer major surface of a contrast enhancement filter of the present invention. The means for providing antireflection are preferably antireflection coatings, more preferably multi-layer antireflection coatings. In a more preferred embodiment, the first means for providing antireflection is a multi-layer fixed attenuation antireflection coating.

In another preferred embodiment, the variable attenuation element is an electrochromic device including a plurality of layers including an electrode, a counterelectrode, an ion conducting layer, and two electrically conductive layers. Preferably, the electrochromic device is index matched. That is, the layers making up the electrochromic device have refractive indices which are nearly equal to one another.

DETAILED DESCRIPTION

The present invention provides low reflectivity contrast enhancement filters having a total visible light reflectance of less than about 2.0%, more preferably less than about 1.5%. Most preferably, the filters have a total visible light reflectance of less than about 1.0%. As used herein the term "total visible light reflectance" refers to the amount of visible light that is reflected from a device expressed as a percentage of the light incident upon the device. As used throughout this application "visible light" refers to electromagnetic radiation having a wavelength ranging from 400 nm to 700 nm.

Figure 1:
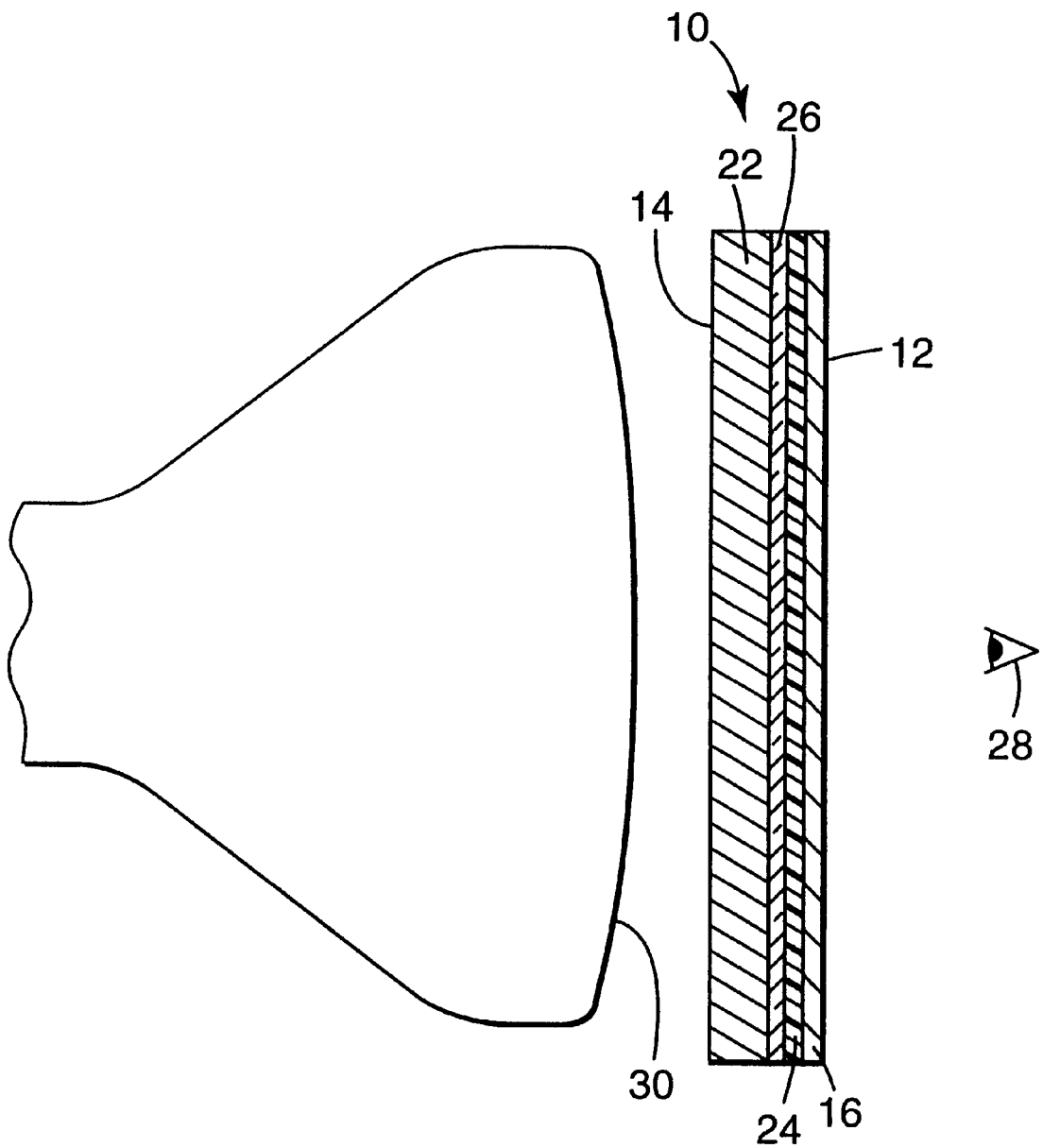
FIG. 1 is a schematic cross-sectional view of a first embodiment of a contrast enhancement filter of the present invention.

Referring now to FIG. 1, a schematic cross-sectional view of a first embodiment of a contrast enhancement filter of the present invention is shown. Contrast enhancement filter 10 has first outer major surface 12 and second major outer surface 14. A first antireflection means is provided in the form of antireflective layer 16 which defines the first outer major surface 12. Interposed between the first outer major surface 12 and the second outer major surface 14 is variable attenuation element 22. Contrast enhancement filter 10 also includes fixed attenuation means 24. Fixed attenuation means 24 is shown in the form of a layer which is interposed between variable attenuation element 22 and the first outer major surface 12. Although the elements and layers are shown as single layers, it is understood that each element or layer may be made up of a plurality of layers, coatings, substrates, and the like.

Contrast enhancement filter 10 also includes at least one transparent substrate 26. In FIG. 1, transparent substrate 26 is positioned between the fixed attenuation means 24 and variable attenuation element 22. Optionally, more than one substrate may be included in a contrast enhancement filter of the present invention. Suitable substrates include, for example, glass or polymeric film. Typically, the substrate is utilized as a starting material (i.e., a carrier layer) upon which the various layer(s) or coating(s) making up a contrast enhancement filter of the present invention are applied. It is understood that various embodiments of the contrast enhancement filter of the present invention may be produced merely by locating the substrate(s) at different positions in the contrast enhancement filter. Optionally, the substrate may be a part of one of the elements in the filter. For example, a dyed polymer film may serve both as a substrate and as a fixed attenuation element.

When in use, contrast enhancement filter 10 is positioned between the viewer 28 and the display 30. First outer major surface 12 is positioned such that it faces the viewer 28. Second outer major surface 14 is positioned such that it faces the display. Optionally, the second outer major surface may be directly affixed or laminated to display 30. Fixed attenuation means 24 is positioned between viewer 28 and variable attenuation element 22. Display 30 may be any type of display, for example, a self luminous display. Light emitted from display 30 passes through filter 10, and impinges upon viewer 28.

Figure 1A:
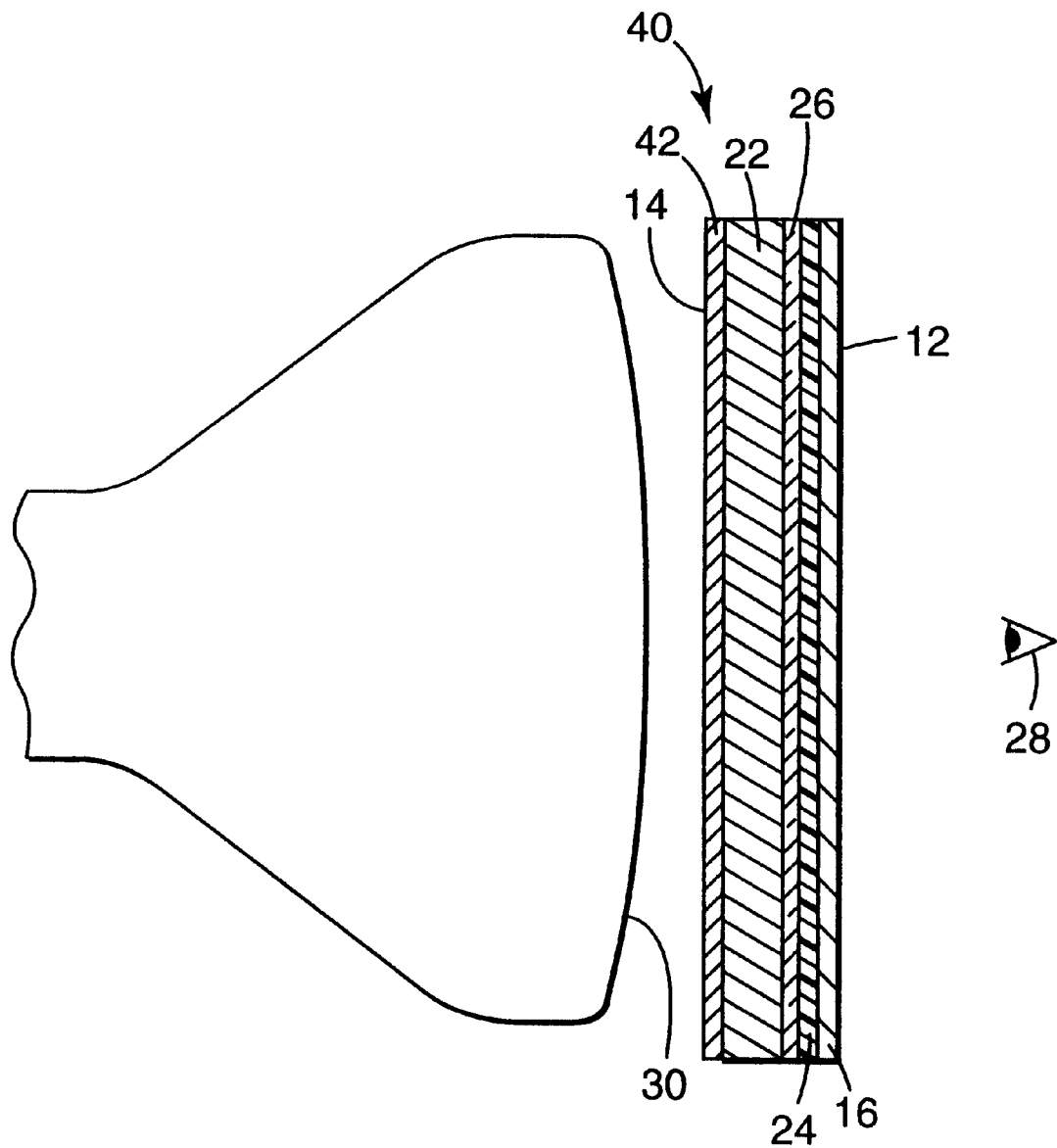
FIG. 1a is a schematic cross-sectional view of a second embodiment of a contrast enhancement filter of the present invention.

Referring now to FIG. 1a, a schematic cross-sectional view of a preferred embodiment of a contrast enhancement filter of the present invention is shown. Contrast enhancement filter 40 includes a second antireflective means provided in the form of antireflection coating 42. Antireflection coating 42 defines the second outer major surface 14 of contrast enhancement filter 40.

Figure 1B:
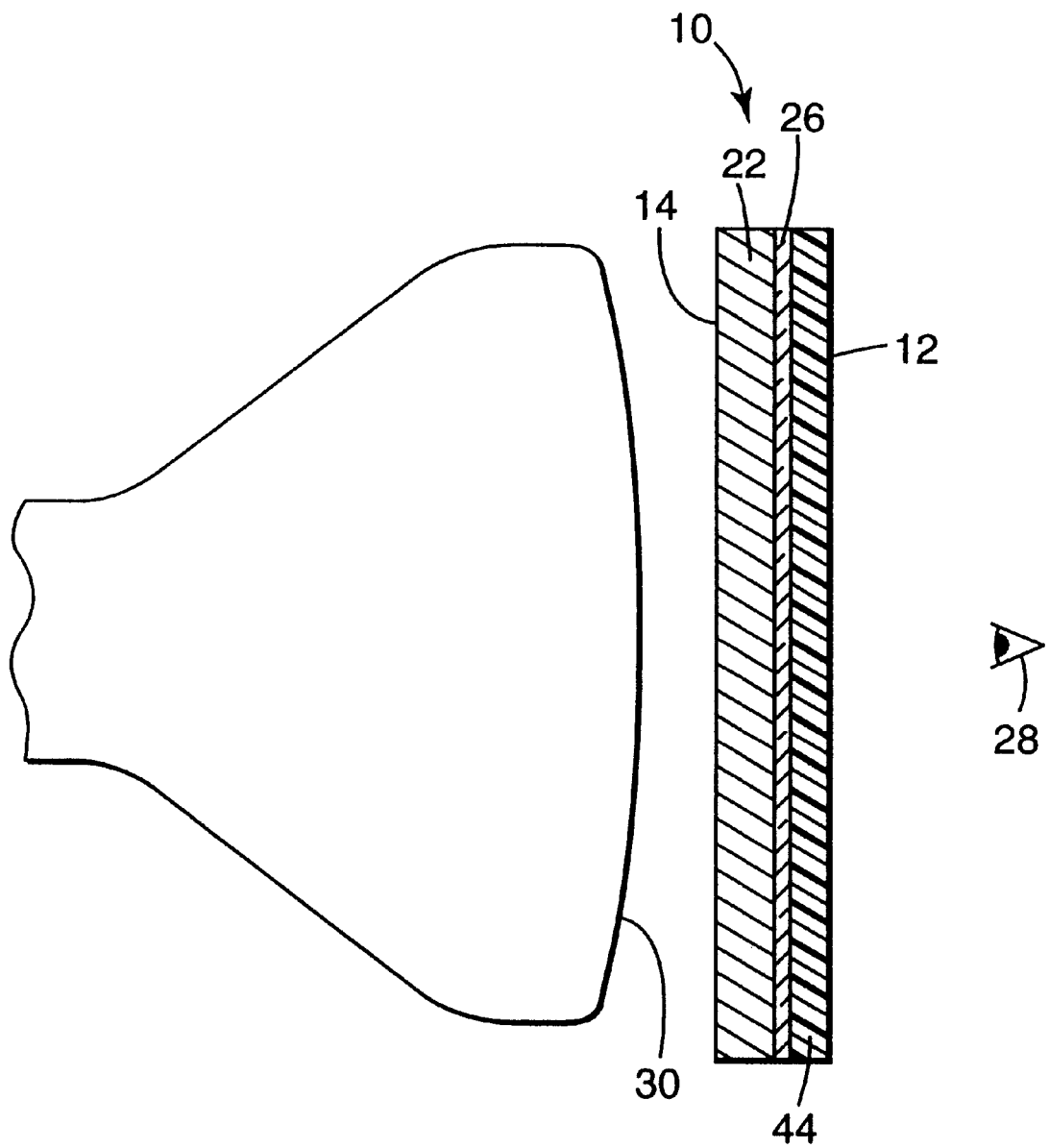
FIG. 1b is a schematic cross-sectional view of a third embodiment of a contrast enhancement filter of the present invention.

Referring now to FIG. 1b, a schematic cross-sectional view of a preferred embodiment of a contrast enhancement filter of the present invention is shown. In this embodiment, the fixed attenuation means and the antireflection means are provided by a fixed attenuation antireflection coating 44.

Figure 2:
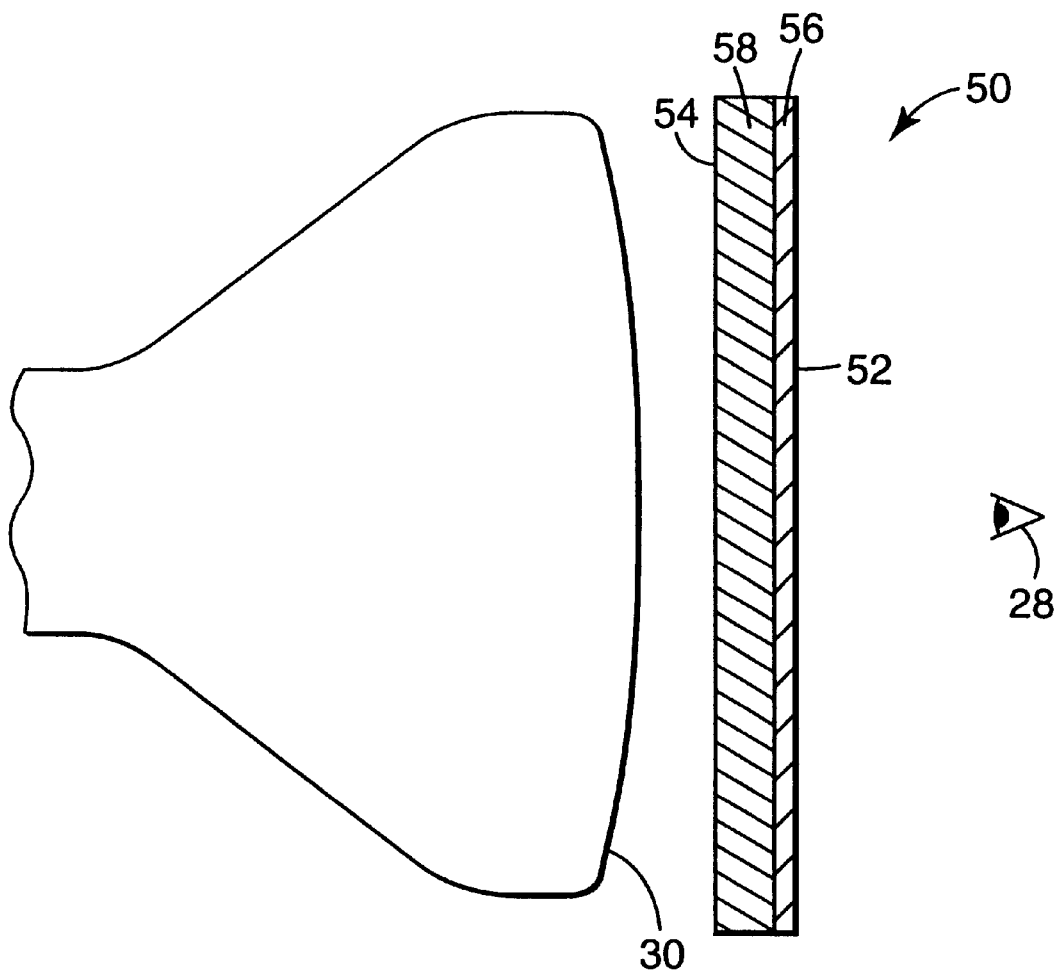
FIG. 2 is a schematic cross-sectional view of a fourth embodiment of a contrast enhancement filter of the present invention.

Referring now to FIG. 2, a schematic cross-sectional view of a contrast enhancement filter of the present invention is shown. Contrast enhancement filter 50 has first outer major surface 52 and second major outer surface 54. A first antireflection means is provided in the form of antireflective coating 56 which defines the first outer major surface 52. Interposed between the first antireflection coating 56 and the second outer major surface 54 is variable attenuation element 58. Variable attenuation element 58 includes a plurality of layers which are index-matched.

When in use, contrast enhancement filter 50 is positioned between the viewer 28 and the display 30. First outer major surface 52 is positioned such that it faces the viewer 28. Second outer major surface 54 is positioned such that it faces the display. Optionally, the second outer major surface may be directly affixed or laminated to display 30. Light emitted from display 30 passes through filter 50, and impinges upon viewer 28. Fixed Attenuator:

Various embodiments of contrast enhancement filters of the present invention include means for providing fixed attenuation. Such fixed attenuators function to attenuate (i.e., reduce) the light emitted from the display, the light reflected from the display and/or the light reflected from surfaces or interfaces in the contrast enhancement filter itself. For example, the fixed attenuation means may attenuate reflections from interfaces in the variable attenuation element. It is preferable to locate the fixed attenuator as near to the first outer major surface as practical. However, means for providing useful fixed attenuation (i.e., that which reduces reflections from the variable transmission element and other interfaces) may be incorporated within an antireflective means, a substrate, within a layer of a variable attenuation element located between the bulk of the element and the first outer major surface, or within an independent element comparably located. For example, a transparent conductor of an electrochromic device may be modified to provide fixed attenuation.

Suitable fixed attenuators include tinted glass or polymer films, coatings of tinted inorganic or polymeric materials, or thin layers of metals. Tinted inorganic materials include colored metal oxides (e.g., transition metal oxides such as $TiO_x$ which are partially deficient in oxygen), and nonoxides such as metal nitrides and metal carbides. Tinted polymeric materials include, for example, polyolefins, polyacrylates, or polyesters containing dyes and/or pigments, or optically absorbing polymers such as polyimide. Metal coatings include thin layers of silver, aluminum, gold, and the like, which may be deposited by known techniques such as vapor deposition or sputter coating. A fixed attenuator may also comprise a circular polarizer film as reported in U.S. Pat. No. 4,073,571 (Ginberg et al.) and U.S. Pat. No. 5,235,443 (Barnik et al.), or a microlouvered light control film as reported in U.S. Pat. No. 5,254,388 (Melby et al.).

The preferred visible light transmission of the fixed attenuator depends upon factors such as the desired light transmission range of the contrast enhancement filter, the amount of interfacial reflection in the filter (i.e., interlayer reflectivity), and the desired maximum reflectivity of the contrast enhancement filter. Generally, the visible light transmission of the fixed attenuator should be sufficiently low to reduce the light reflected from interfaces within the filter. Typically, the fixed attenuator will have a visible light transmission of about 50% to 90%, more preferably about 65% to 80%. Most preferably, the fixed attenuator has a visible light transmission of about 70%. Antireflection Means:

Embodiments of a contrast enhancement filter of the present invention may include one or more means for providing antireflection. Such means for providing antireflection may be any antireflective coating known in the art. Antireflection coatings may be provided in the form of single layer coatings or multiple layer coatings. A simple antireflective coating for an interface with air is a single layer of a transparent material having a refractive index less than that of the substrate (i.e., the material adjacent to the interface) on which it is disposed. The thickness of such a layer may be about one-quarter wavelength, at a wavelength of about 520 nm. The refractive index of the layer may be approximately equal to the square root of the refractive index of the substrate. Multilayer antireflection coatings may be produced by depositing two or more layers of transparent conductive material on a substrate. At least one layer has a refractive index higher than the refractive index higher than the refractive index of the substrate. Multilayer systems typically include at least three layers. The first or outermost layer has a refractive index lower than that of the substrate and an optical thickness of about one-quarter wavelength, at a wavelength of about 520 nm. The second or middle layer has a refractive index higher than that of the substrate and an optical thickness of about one-half wavelength, at a wavelength of about 520 nm. The third layer has a refractive index greater than that of the substrate but less than that of the second layer. The thickness of the third layer is about one-quarter wavelength at a wavelength of about 520 nm. A four layer antireflective coating is reported in U.S. Pat. No. 3,432,225 (Lockhart et al.). Preferred antireflective coatings include those reported in U.S. Pat. No. 5,105,310 (Dickey). An antireflective layer may also be interposed between two layers having different refractive indexes (i.e., index mismatched) such as a substrate and a transparent conductor.

The fixed attenuation means and the antireflective means may comprise a combined element or multiple elements. Each element may comprise a single layer or more than one layer. Typically, more than one layer is used to provide both fixed attenuation and antireflection. The fixed attenuation means may be incorporated within, may be adjacent to, or may be separated from the antireflective means. In a preferred embodiment, antireflection means and fixed attenuation means are provided by a fixed attenuation antireflection coating. Such fixed attenuation antireflective coatings are reported in U.S. Pat. No. 5,091,244 (Biornard). These fixed attenuation antireflective coatings comprise a first layer including a material substantially transparent to visible light and having a refractive index between about 1.35 and 1.9. The optical thickness of the first layer is about one quarter wavelength between about 480 and 560 nm. The first layer forms the first outer major surface of the contrast enhancement filter. The coating further includes a second layer including a transition metal nitride having a thickness between about 5 and 40 nm. A third layer of the coating includes a material substantially transparent to visible light and having a refractive index between about 1.35 and 2.65. The optical thickness of the third layer is less than or equal to about one-quarter wavelength at between about 480 and 560 nm. The fourth layer of the coating also substantially includes a transition metal nitride having between about 5 and 40 nm. Optionally, the coating may also include a fifth layer of material substantially transparent to visible light and having a refractive index between 1.35 and 2.65. The optical thickness of the fifth layer is less than or equal to one-quarter wavelength at a wavelength between about 480 and 560 nm. Transition metal nitrides include titanium, zirconium, hafnium, vanadium, tantalum, niobium, and chromium. These fixed attenuation antireflective coatings are preferably applied by DC reactive sputtering in an atmosphere which may include nitrogen or ammonia. A particularly preferred fixed attenuation antireflection coating is available under the trade designation "TDAR" from Viratec Thin Films, Inc., Faribault, Minn.

A contrast enhancement filter of the present invention also includes a variable attenuation element. As used herein "variable attenuation" means that the visible light transmission of the element can be altered or adjusted between at least two levels of visible light transmission. As used herein "visible light transmission" refers to the amount of visible light that passes through the filter, element, layer, coating or substrate expressed as a percentage of the light incident upon the filter, element, layer, coating or substrate. Preferably, the variable attenuation element has continuously or infinitely variable visible light transmission. A preferred range of visible light transmission is from about 35% to 75%. The variable attenuation element can comprise any of a number of light modulating device types including, for example, a polydisperse liquid crystal device, suspended polyiodide materials, or chromophores in an electrolyte solution. Typically, the variable attenuation element comprises a multiplicity of layers, which may include transparent conductors and optically functional layers, and which may include inorganic materials, organic materials, composite materials, or a combination. Preferably, the variable attenuation element is an electrochromic device. As used herein "electrochromic" refers to a material having optical properties which change upon the application of an electric current or potential. Electrochromic devices are known in the art and typically have a multilayer structure including a layer of an electrically conductive material, an electrode formed from a layer of an electrochromic material, an ion conductive layer, a counterelectrode, and another electrically conductive layer.

Figure 3:
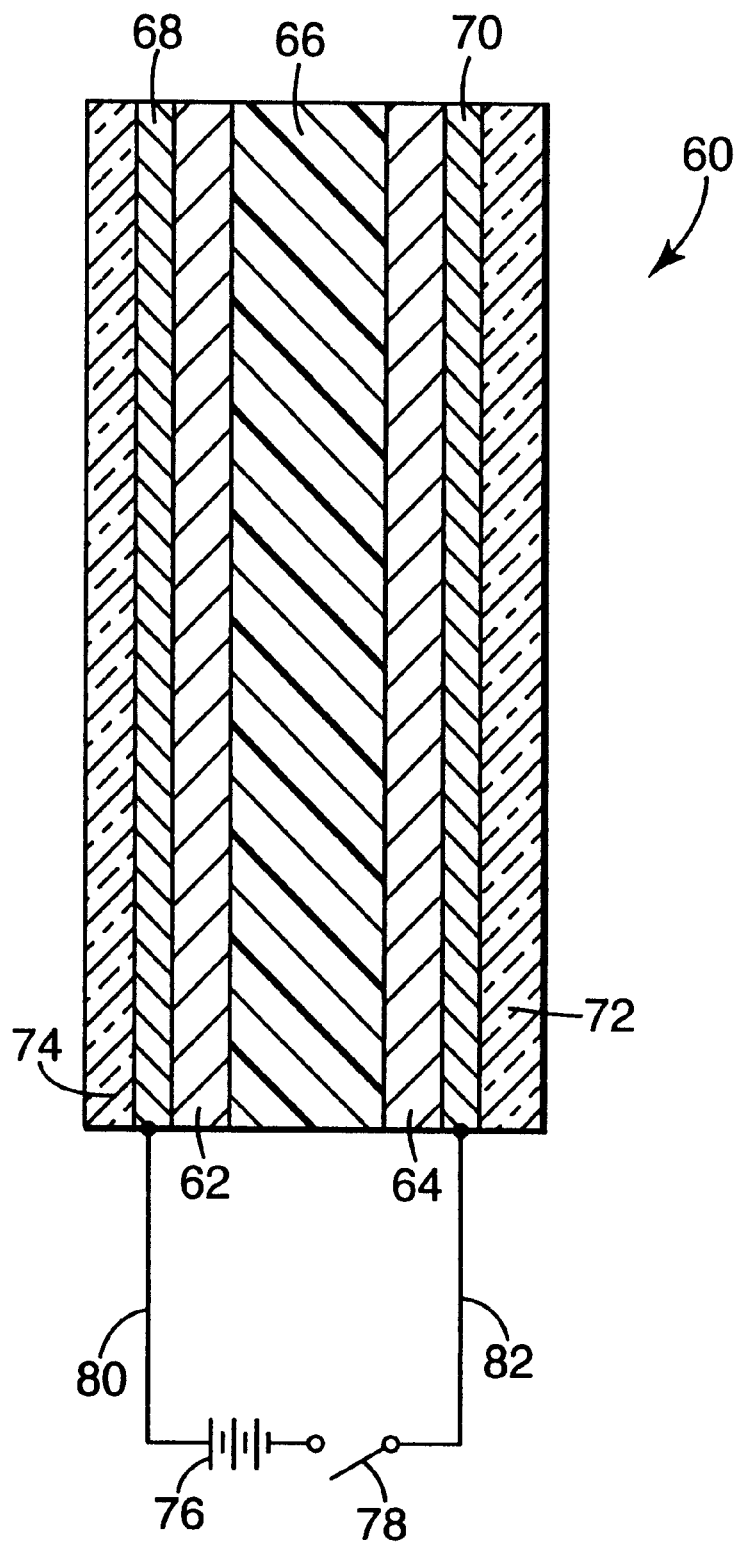
FIG. 3 is a schematic cross-sectional view of a variable attenuation element.

Referring now to FIG. 3, a schematic cross-sectional view of an electrochromic variable attenuation element 60 is shown. Variable attenuation element 60 includes electrode 62, counterelectrode 64, and ion conducting layer 66. Ion conducting layer 66 is interposed between electrode 62 and counter electrode 64. Electrode 62, counterelectrode 64 and ion conducting layer 66 are located between first electrically conductive layer 68 and second electrically conductive layer 70. The first and second electrically conductive layers 68 and 70 are in electrical contact with the electrode 62 and counterelectrode 64, respectively. The electrode 62 and counterelectrode 64 are in electrical contact with the ion conducting layer 66. Electrochromic variable attenuation element 60 may further include one or more substrates 72 and 74.

A low voltage battery 76 and switch 78 are connected to the element 60 by conductive wires 80 and 82. In order to alter the optical properties of element 60, switch 78 is closed whereupon battery 76 causes an electric potential to be created across the element 60. The polarity of the battery will govern the nature of the electric potential created and thus the change in optical properties of element 60.

Electrode 62 is preferably formed from an electrochromic material (i.e., a material whose optical properties can be reversibly altered as its oxidation state changes). The thickness of electrode 62 will normally be such that in the "colored" state an acceptable reduction in the transparency of the contrast enhancement filter is obtained. Suitable electrochromic materials include, for example, molybdenum oxide, nickel oxide, iridium oxide, niobium oxide, titanium oxide, tungsten oxide, and mixtures thereof The preferred material is amorphous tungsten trioxide (i.e., $WO_3$).

Counterelectrode 64 is typically formed form a material which is capable of storing ions and then releasing the ions for transmission to electrode 62 in response to an appropriate electrical potential. The thickness of counterelectrode 64 is preferably such that the counterelectrode is capable of transmitting a large enough quantity of ions to electrode 62 to effect in that layer an acceptable change in color. Some counterelectrode materials are electrochromic in that their optical properties change as they give up or receive ions in response to the application of an electric potential. Suitable electrochromic counterelectrode materials include, for example, vanadium oxide, niobium oxide, indium oxide, nickel oxide, cobalt oxide, molydenum oxide and mixtures thereof Vandium oxide is the preferred counterelectrode material.

It may be advantageous, in some situations, for electrode 62 and counterelectrode 64 to be made of complementary electrochromic materials. By complementary electrochromic materials it is meant that the visible light transmission of one of the materials decreases when it gains ions and the visible light transmission of the other layer decreases when it losses ions. When complementary electrochromic materials are used, the movement of ions from one electrochromic material to the complementary electrochromic material produces a greater change in visible light transmission because both of the materials simultaneously change in visible light transmission. Suitable complementary electrochromic layers include tungsten trioxide (i.e., $WO_3$), which decreases in visible light transmission when it gains ions, and vanadium pentoxide (i.e., $V_2O_5$), which decreases in visible light transmission when it loses ions.

Ion conducting layer 66 provides a medium for conducting ions between the electrode 62 and counterelectrode 64. Suitable materials for ion conducting layer 66 for the transmission of lithium ions include, for example, lithium silicate, lithium borosilicate, lithium aluminum silicate, lithium niobate, lithium nitride and lithium aluminum fluoride. Suitable materials for hydrogen ions include tantalum pentoxide and silicon dioxide. A preferred material for ion conducting layer 66 comprises methoxypolyethyleneoxide methacrylate and lithium perfluorobutane sulfonate or lithium trifluoromethanesulfonimide (commercially available as HQ-115 from Minnesota Mining and Manufacturing Company, St. Paul, Minn.). The methoxypolyethyleneoxide methacrylate is preferably photocured via exposure to ultraviolet light in the presence of a free radical photoinitiator, for example, 2,2-dimethoxy-2-phenylacetophenone (commercially available under the trade designation "KB 1" from Sartomer Corp., Exton, Pa.).

Preferably, electrochromic device 60 is a low reflectance variable attenuation element. Variable transmission elements tend to produce undesirably high total reflection because they typically comprise several layers of materials having differing refractive indices, which result in reflections from the interfaces. The total reflectance may be lowered by index matching the layers of the device. As used herein the phrase "index-matched" or "index matching" is used to describe electrochromic devices in which the layers making up the device have refractive indexes which are nearly equal to one another. Preferably, the most mismatched pair of adjacent layers in the element have refractive indices that differ by no greater than 0.4.

Preferably, electrochromic device 60 has sufficiently index-matched layers for use in the inventive contrast enhancement filter. That is, the layers are sufficiently index matched to provide a contrast enhancement filter having a total visible reflectance of less than about 2.0%. More preferably, the contrast enhancement filter comprises an index matched variable attenuation element and a fixed attenuation element.

Ion conducting layer 66 may be a significant source of interfacial reflection. This reflection may be detrimental to the effectiveness of a contrast enhancement filter of the present invention. For example, ion conducting layers comprising methoxypolyethyleneoxide methacrylate and Li salts exhibit a refractive index below about 1.4. Electrode 62 and counterelectrode 64 are typically made of electrochromic materials, for example, metal oxides, which exhibit refractive indices of about 1.7 or greater. As a result of the difference in refractive index between the electrode layers (i.e., electrode 62 and counterelectrode 64) and the ion conducting layer 66, the interfaces between these layers may produce significant reflection of visible light. In a contrast enhancement filter of the present invention, these differences in refractive index are preferably reduced by incorporating refractive index modifiers in the electrode layers and in the ion conducting layer 66. In this way, the refractive index of the electrode layers more nearly matches the refractive index of the ion conducting layer 66. A suitable reactive index modifier for reducing the refractive index of an electrochromic metal oxide layer is silicon dioxide (i.e., $SiO_2$). Silicon dioxide can be advantageously added to the electrochromic metal oxides to reduce their refractive index from about 2.0 to about 1.8. Typically, up to about 25 volume percent silicon dioxide is added to the metal oxide film. A suitable refractive index modifier for increasing the refractive index of an ion conducting layer of polymerized methoxypolyethyleneoxide methacrylate is 2-bromonapthalene. The addition of 2-bromonapthalene can be advantageously added to increase the refractive index of polymerized methoxypolyethyleneoxide methacrylate from less than about 1.4 to about 1.5. Typically about 25 weight percent 2-bromonapthalene is added directly to the mixture of lithium salt and methoxypolyethyleneoxide methacrylate comprising the ion conductor prior to forming a layer. As a result, the difference in refractive index between the electrode layers and the ion conducting layer may be reduced from about 0.6 to about 0.3.

First and second electrically conductive layers 68 and 70 may be any suitable transparent conductive material. The materials forming layer 68 and 70 need not be the same. Suitable materials include, for example, doped tin oxide, doped zinc oxide, tin-doped indium oxide. A preferred material is fluorinated tin oxide. Typically, the electrically conductive material is deposited on a transparent substrate, for example, glass. Glass sheets having one side coated with fluorinated tin oxide are commercially available under the trade designation "TECH 15" from Libby-Owens-Ford, Toledo, Ohio. Tech 15 also contains means for reducing the reflectivity at the interface between the transparent conductor and the glass substrate, another source of significant reflection.

Figure 3A:
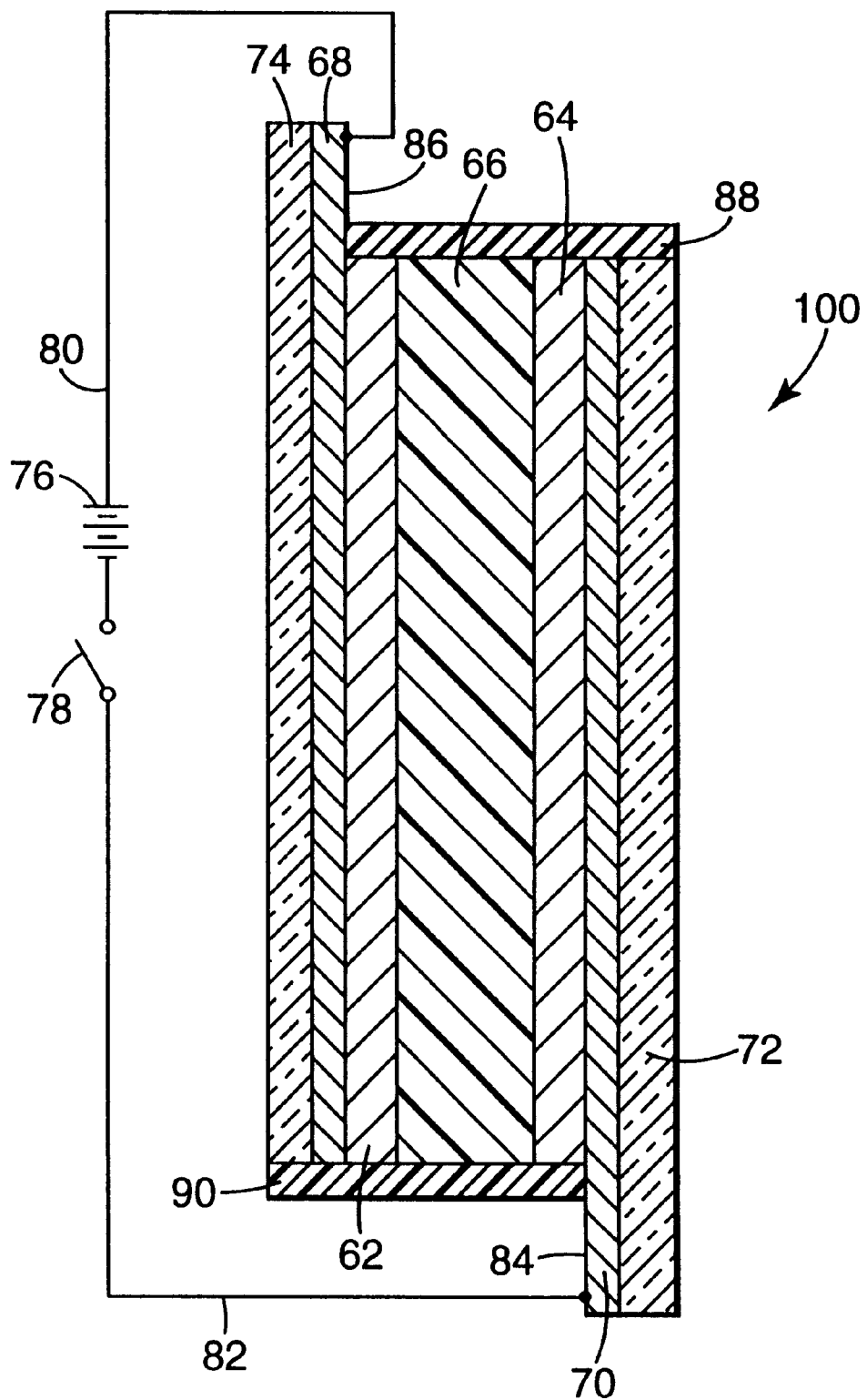
FIG. 3a is a schematic cross-sectional view of a variable attenuation element.

A preferred embodiment of an electrochromic variable attenuation element 100 is shown in FIG. 3a. In this preferred embodiment, electrically conductive layers 68 and 70 have exposed major surfaces 86 and 84, respectively. Exposed major surfaces 84 and 86 provide a point for attachment of conductive wires 82 and 80 to electrically conductive layers 70 and 68, respectively. Moisture sealant layers 88 and 90 are preferably applied over the edges of the various layers making up the variable attenuation element 100. Suitable moisture sealants include, for example, polyisobutlyene (commercially available under the trade designation "760–26x" from Tremco Inc., Cleveland, Ohio) and the like.

Each of the layers making up electrochromic element may be deposited by known techniques, provided that discrete continuous individual layers are formed. The particular method of deposition for each layer depends upon several parameters, including, for example, the material being deposited and the thickness of the layer being deposited. Deposition techniques including RF sputtering, chemical vapor deposition, plasma enhanced chemical vapor deposition, sol-gel techniques and other known methods for depositing thin films are typically used.

The following non-limiting examples will further illustrate the invention.

EXAMPLES

General Procedure I (Preparation of Tungsten
Oxide Precursor Solution)

A tungsten oxide precursor solution was prepared by the following procedure. First, 20 grams of 99.99% +ammonium metatungstate ($NH_4WO_3$) was dissolved in 100 grams of deionized water. The ammonium metatungstate solution was acidified using an ion exchange column containing about 90 $cm^3$ of Amberlite IR 120™ acidic ion exchange resin (commercially available from Fluka Chemical Corp., New York). The solution was added to this column and allowed to drain at a controlled rate of about 50–70 $cm^3$ per minute. The pH of the column effluent was monitored with a pH meter. When the pH of the effluent dropped to below 2 collection of the effluent began. Approximately 130 milliliters of effluent was collected. To the 130 ml of effluent, 10 grams of a 30% weight solution hydrogen peroxide was added. The resulting mixture was stirred at room temperature for about 30 minutes and was then dried in a rotary evaporator at 40° C. The resulting dried powder was dissolved in 90 ml of absolute ethanol at 60° C. It took approximately 1–2 hours to dissolve the dried powder. After this, 5 milliliters of deionized water was added to the solution. The solution was then refluxed for 90 minutes at about 77° C. The resulting solution contained about 18% by weight tungsten oxide and had a viscosity of 2.5 centistokes at room temperature. To 25 ml of the tungsten oxide solution was added a solution containing 3 ml of silicon ethoxide (commercially available as catalog number 33,385-9 from Aldrich Chemical Co., Milwaukee Wis.) in 10 ml of ethanol.

General Procedure II (Preparation of Vanadium
Oxide Precursor Solution)

First, an 8% by weight solution of sodium metavanadate ($NaVO_3$) was prepared by dissolving an appropriate amount of $NaVO_3$ powder in water. The $NaVO_3$ and water were stirred for several hours until the $NaVO_3$ powder was completely dissolved. 4700 grams of the sodium metavanadate solution was acidified using 3600 milliliters of Amberlite IR-120 ion exchange resin (commercially available from Fluka Chemical Corp., New York) to form a solution of vanadic acid having a pH less than 2. Immediately following acidification, approximately 4500 grams of the vanadic acid solution was partially neutralized with a 12% weight solution of lithium hydroxide monohydrate ($LiOH.H_2O$) in water. The resulting acidic lithium vanadate solution had a pH of about 5.30. The ratio of lithium to vanadium in the solution was measured using inductively coupled plasma emission spectroscopy and was found to be 0.53 to 1.00. The lithium vadadate solution had a solids content of 3% by weight. A 760 gram aliquot of the acidic lithium vanadate solution was dried by rotary vacuum evaporation at 40° C. to form an orange solid. The solid was dissolved in 380 grams of ethanol. Dissolution in ethanol was carried out by stirring at room temperature for several hours, followed by refluxing at the boiling point for at least an hour. Following refluxing, a small amount of undissolved solid remained and was allowed to settle, leaving a transparent orange vanadium oxide precursor solution.

Example 1

Figure 4:
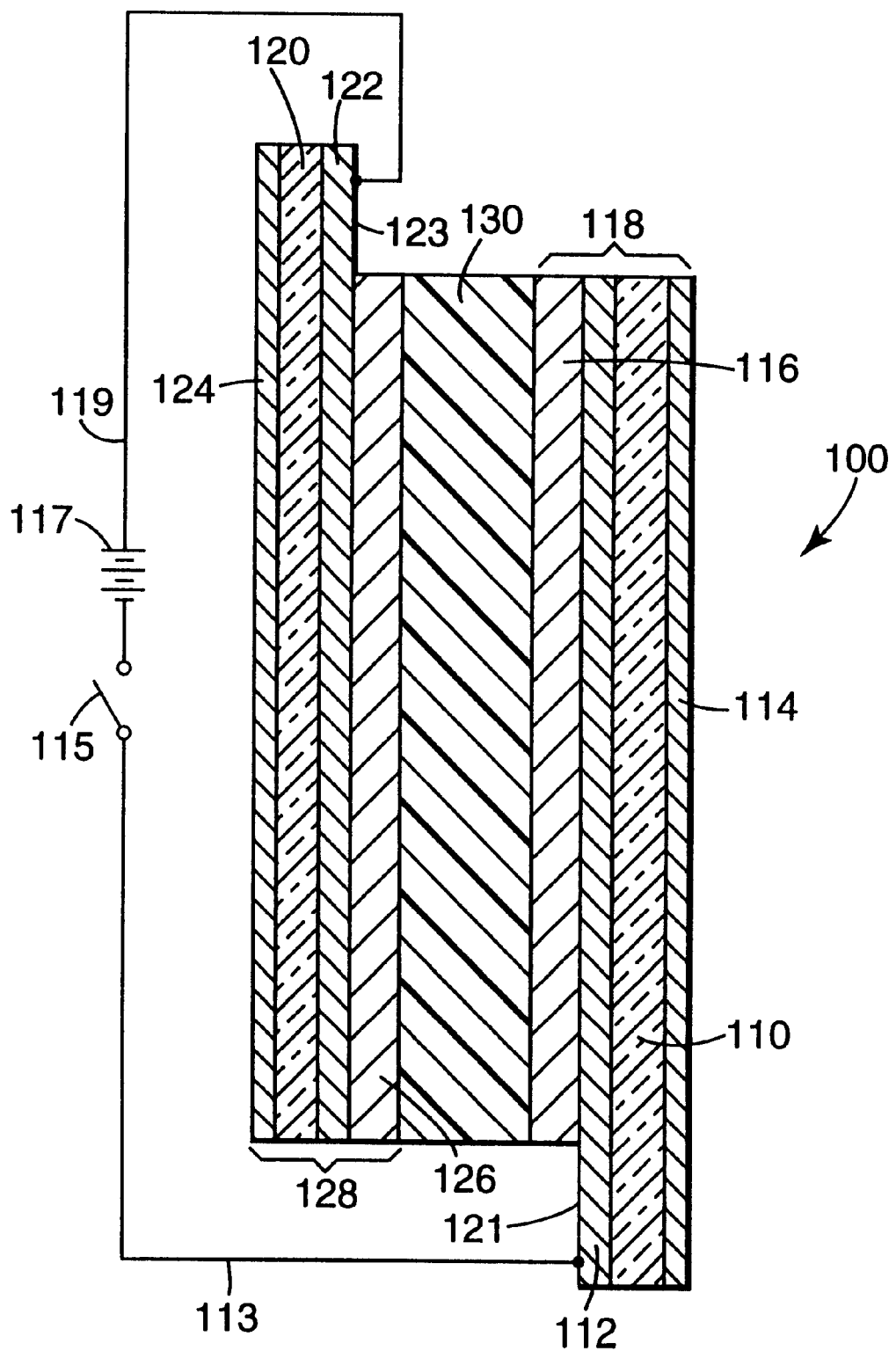
FIG. 4 is a schematic cross-sectional view of a fifth embodiment of a contrast enhancement filter of the present invention.

Referring to FIG. 4, contrast enhancement filter 102 was made according to the following procedure.
Preparation of Subassembly 118:
Substrate 110 having first electrically conductive layer 112 was provided in the form of a 25.4 cm (10 inch) by 27.9 cm (11 inches) glass sheet having a transparent fluorinated tin oxide coating (commercially available from Libby-Owens-Ford under the trade designation "TECH-15"). Next, a fixed attenuation antireflective coating 114 having a visible light transmission of about 70% was sputter deposited over the major surface of substrate 110 opposite electrically conductive layer 112. The fixed attenuation antireflective coating 114 was applied by Viratec Thin Films Inc., Faribault, Minn. (commercially available under the trade designation "TDAR-70"). A polyethylene cover sheet (not shown) was applied over the fixed attenuation antireflective coating. Following this, electrode 116 was applied over first electrically conductive layer 112. Electrode 116 was applied by dipping substrate 110 into 1.5 liters of tungsten oxide precursor solution which had been prepared in accordance with General Procedure I. Substrate 110 was withdrawn from the tungsten oxide precursor solution at a rate of about 20 centimeters per minute. Exposed surface 121 of first electrically conductive layer 112 was left uncoated to provide a point of attachment for conductive wire 113. After coating the tungsten oxide precursor solution, the polyethylene cover sheet was removed from the fixed attenuation antireflective coating. Next, the coating of tungsten oxide precursor was heat treated in a box furnace for 10 minutes at 225° C. The weight gain resulting from application of electrode 116 was determined and the coating thickness of the electrode was calculated assuming a density of 5.00 grams/cm$^3$ for tungsten oxide. The thickness of electrode 116 was calculated to be about 3000 Angstroms.

Preparation of Subassembly 128:

Substrate 120 having second electrically conductive layer 122 was provided in the form of a 25.4 cm (10 inch) by 27.9 cm (11 inches) glass sheet having a transparent fluorinated tin oxide coating (commercially available from Libby-Owens-Ford under the trade designation "TECH-15"). Next, an antireflective coating 124 having a visible light transmission of about 95% was sputter deposited over major surface of substrate 120 opposite electrically conductive layer 122. The antireflective coating 124 was applied by Viratec Thin Films Inc., Faribault, Minn. (commercially available under the trade designation "CDAR-95." A polyethylene cover sheet was applied over the antireflective coating. Following this, counterelectrode 126 was applied over second electrically conductive layer 122. Counterelectrode 126 was applied by dipping substrate 120 into 1.5 liters of vanadium oxide precursor solution which had been prepared in accordance with General Procedure II. Exposed surface 123 of first electrically conductive layer 122 was left uncoated to provide a point of attachment for conductive wire 119. Substrate 120 was withdrawn from the vanadium oxide precursor solution at a rate of about 22 centimeters per minute. After coating the vanadium oxide precursor solution, the polyethylene cover sheet was removed from the antireflective coating. Next, the dried coating of vanadium oxide precursor was heat treated in a box furnace for 20 minutes at 190° C. The weight gain resulting from application of counterelectrode 126 was determined and the coating thickness of the counterelectrode was calculated assuming a density of 5.00 grams/cm$^3$ for vanadium oxide. The thickness of counterelectrode 126 was calculated to be about 3000 Angstroms.

Subassemblies 118 and 128 were stored in a dry nitrogen environment while awaiting assembly. Assembly of the device was accomplished by laminating subassembly 118 to subassembly 128 using ion conducting adhesive layer 130 as described below.

Preparation of Ion Conducting Adhesive 130:

Ion conducting adhesive layer 130 was prepared as a liquid resin which was placed between electrode 116 and counterelectrode 126 and was cured. The liquid resin was prepared by combining the ingredients shown in Table 1.

TABLE 1

| Component | Parts by weight |
|---|---|
| methoxypolyethyleneoxide methacrylate monomer (available from Shin Nakamura Chemical Co., Japan) | 63.36 |
| lithium perfluorbutanesulfonate | 36.30 |
| 2,2-dimethoxy-2-phenylacetophenone photoinitiator (available from Sartomer Co., Exton, PA under the trade designation "IRGACURE KB1") | 0.10 |
| 2-bromonaphthalene (available as catalog number 18,364-4, from Aldrich Chemical Co., Milwaukee, WI). | 50.00 |

Lamination of subassembly 118 to subassembly 128 was carried out by placing spacer tape (commercially available as No. 810 tape from Minnesota Mining and Manufacturing Company, St. Paul, Minn.) having a thickness of about 51 micrometers (0.002 inches) around the edges of electrode 116 and depositing approximately 30 milliliters of liquid resin over the surface of electrode 116. Subassembly 128 was then pressed into contact with the spacer tape such that the liquid resin wet the surface of counterelectrode 126. Excess resin was ejected from the edges of the assembly. After removing the excess resin, the assembly was exposed for 5 minutes to two 15 watt UV lamps (available from Sylvania under the trade designation "TYPE 350 BACK-LIGHT BULBS"). The lamps were mounted in a standard fluorescent light fixture having a white diffuse reflector behind the lamps.

The resulting contrast enhancement filter was connected to DC power source 117 through conductive wires 113 and 119 which were connected to electrically conductive layers 112 and 122, respectively. The DC power source comprised a 9 volt battery, timing, switching, and voltage control circuitry which enabled the polarity of a predetermined voltage applied between the conductive wires to be reversed, and further provided for opening the power circuit after a predetermined time period or by opening switch 115.

The resulting contrast enhancement filter of the present invention had a range of visible light transmission ranging from about 25% to 55%, and was found to be suitable for contrast enhancement when used in combination with a color CRT display. The device was life tested by cycling over this range by applying a voltage of 2.5 volts of alternating polarity for 1000 cycles. The range of visible light transmission and the total charge transfer required to produce a full cycle of optical density remained substantially constant over the 1000 cycles.

Comparative Examples A–C

Comparative Example A:

This comparative example was prepared as described in Example 1 with the following exceptions. First, fixed attenuation antireflection coating 114 and antireflection coating 124 were omitted. Second, the silicon ethoxide/ethanol solution was omitted from the tungsten oxide precursor solution (see, General Procedure I) and the 2-bromonapthalene was omitted from the ion conducting adhesive formulation (see, Table 1).

Comparative Example B:

This comparative example was prepared as described in Example 1 except that fixed attenuation antireflection coating 114 and antireflection coating 124 were omitted.

Comparative Example C:

This comparative example was prepared as described in Example 1 except that the silicon ethoxide/ethanol solution was omitted from the tungsten oxide precursor solution (see, General Procedure I) and the 2-bromonapthalene was omitted from the ion conducting adhesive formulation (see, Table 1).

Reflectivity Measurements:

Reflectivity of Example 1 and Comparative Examples A–C was measured using a Shimadzu model UV PC 3101 spectrophotometer (commercially available from Shimadzu Corp.) with an absolute spectral reflectance attachment. The results are set forth in Table 2. The spectrophotometer beam was incident upon the side of the device designated in Table 2.

TABLE 2

Reflectivity as a function of percent transmission.

| Device | Percent Transmission of Device | | | | |
|---|---|---|---|---|---|
| | 25% T | 30% T | 47% T | 55% T | 60% T |
| Comp. Ex. A: | | | | | |
| WO$_3$ side | — | 6.4 | — | 9.6 | — |
| V$_2$O$_5$ side | — | 6.5 | — | 7.9 | — |
| Comp. Ex. B: | | | | | |
| WO$_3$ side | — | 4.5 | — | 6.5 | — |
| Comp. Ex. C: | | | | | |
| WO$_3$ side | — | 1.5 | 2.3 | 3.4 | 4.1 |
| V$_2$O$_5$ side | — | 1.9 | 2.0 | 2.3 | 2.2 |
| Example 1: | | | | | |
| WO$_3$ side | 0.95 | 1.0 | 1.3 | — | — |

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A low reflectivity, contrast enhancement filter having a first outer major surface and a second outer major surface, the filter comprising:
   (i) a first means for providing antireflection, the first means defining the first outer major surface;
   (ii) a variable attenuation element interposed between the first major outer surface and the second major outer surface;
   (iii) means for providing fixed attenuation interposed between the variable attenuation element and the first major outer surface; and
   (iv) at least one substrate;
   wherein the contrast enhancement filter has a total visible light reflectance of less than about 2.0% when measured with light incident to the first outer major surface.

2. The contrast enhancement filter of claim 1 wherein the contrast enhancement filter has a total visible light reflectance of less than about 1.5% when measured with light incident to the first outer major surface.

3. The contrast enhancement filter of claim 1 wherein the contrast enhancement filter has a total visible light reflectance of less than about 1.0% when measured with light incident to the first outer major surface.

4. The contrast enhancement filter of claim 1 wherein the variable attenuation element has index-matched layers.

5. The contrast enhancement filter of claim 1 wherein the first means for providing antireflection and the means for providing fixed attenuation are provided in the form of a fixed attenuation antireflection coating.

6. The contrast enhancement filter of claim 5 wherein the fixed attenuation antireflection coating comprises a first layer including a material substantially transparent to visible light and having a refractive index between about 1.35 and 1.9 and an optical thickness of about one quarter wavelength between about 480 nm and about 560 nm, the first layer defining the first outer major surface; a second layer including a transition metal nitride and having a thickness between about 5 nm and 40 nm; a third layer including a material substantially transparent to visible light and having a refractive index between about 1.35 and 2.65 and an optical thickness less than or equal to about one-quarter wavelength between about 480 nm and about 560 nm; a fourth layer including substantially a transition metal nitride and having a thickness between about 5 nm and 40 nm; a fifth layer including a material substantially transparent to visible light and having a refractive index between about 1.35 and 2.65 and an optical thickness less than or equal to about one-quarter wavelength between about 480 nm and about 560 nm; a sixth layer including substantially a transition metal nitride having a thickness between about 5 nm and 40 nm.

7. The contrast enhancement filter of claim 6 wherein the transition metal nitride layers comprise substantially a material selected from the group consisting of titanium nitride, zirconium nitride, hafnium nitride, vanadium nitride, niobium nitride, tantalum nitride and chromium nitride.

8. The contrast enhancement filter of claim 1 further including a second means for providing antireflection, the second means defining the second outer major surface.

9. The contrast enhancement filter of claim 1 wherein the variable attenuation element is an electrochromic device comprising:
   (i) an electrode formed from an electrochromic material and having a first index of refraction;
   (ii) a counterelectrode having a second index of refraction; and
   (iii) an ion conducting layer for conducting ions between the electrode and the counterelectrode, the ion conduction layer having a third index of refraction;
   wherein the electrochromic device is interposed between first and second electrically conductive layers for applying an electric potential across the electrochromic device, and wherein a difference between the first index of refraction and the third index of refraction is less than about 0.4 and wherein a difference between the second index of refraction and the third index of refraction is less than about 0.4.

10. The contrast enhancement filter of claim 9 wherein the means for providing fixed attenuation comprises a tinted polymeric material, a tinted inorganic material, a metal coating, a circular polarizer film, or a microlouvered film.

11. The contrast enhancement filter of claim 10 wherein the tinted polymeric material is a dyed polyester film, dyed polyolefin film, dyed polyacrylate film, pigmented polyester film, pigmented polyolefin film, pigmented polyacrylate film, or a combination thereof.

12. The contrast enhancement filter of claim 10 wherein the metal coating comprises silver, aluminum, gold, or a combination thereof.

13. The contrast enhancement filter of claim 9 wherein the electrode comprises tungsten oxide and silicon dioxide.

14. The contrast enhancement filter of claim 9 wherein the counterelectrode comprises vanadium oxide and silicon dioxide.

15. The contrast enhancement filter of claim 9 wherein the ion conduction layer comprises methoxypolyethyleneoxide methacrylate and 2-bromonapthalene.

16. The contrast enhancement filter of claim 1 wherein the variable attenuation element has a visible light transmission that can be varied from about 35% to 75%.

17. The contrast enhancement filter of claim 1 wherein the means for providing fixed attenuation has a visible light transmission of about 50% to 90%.

18. The contrast enhancement filter of claim 1 wherein the means for providing fixed attenuation has a visible light transmission of about 65% to 80%.

19. The contrast enhancement filter of claim 1 wherein the means for providing fixed attenuation has a visible light transmission of about 70%.

20. The contrast enhancement filter of claim 1 wherein the second outer major surface is affixed to a display.

21. A low reflectivity, contrast enhancement filter having a first outer major surface and a second outer major surface, the filter comprising:

(i) a first means for providing antireflection, said means defining the first outer major surface;

(ii) a variable attenuation element interposed between the first means for providing antireflection and the second major outer surface, the variable attenuation element having index-matched layers; and (iii) at least one substrate;

wherein the contrast enhancing filter has a total visible light reflectance of less than about 2.0% when measured with light incident to the first outer major surface.

22. The contrast enhancement filter of claim 21 wherein the contrast enhancement filter has a total visible light reflectance of less than about 1.5% when measured with light incident to the first outer major surface.

23. The contrast enhancement filter of claim 21 wherein the contrast enhancement filter has a total visible light reflectance of less than about 1.0% when measured with light incident to the first outer major surface.

24. The contrast enhancement filter of claim 21 further including a second means for providing antireflection, the second means defining the second outer major surface.

25. The contrast enhancement filter of claim 21 wherein the variable attenuation element is an electrochronic device comprising:

(i) an electrode formed from an electrochromic material and having a first index of refraction;

(ii) a counterelectrode having a second index of refraction; and (iii) an ion conducting layer for conducting ions between the electrode and the counterelectrode, the ion conduction layer having a third index of refraction;

wherein the electrochromic device is interposed between first and second electrically conductive layers for applying an electric potential across the electrochromic device, and wherein a difference between the first index of refraction and the third index of refraction is less than about 0.4 and wherein a difference between the second index of refraction and the third index of refraction is less than about 0.4.

26. The contrast enhancement filter of claim 25 wherein the electrode comprises tungsten oxide and silicon dioxide.

27. The contrast enhancement filter of claim 25 wherein the counterelectrode comprises vanadium oxide and silicon dioxide.

28. The contrast enhancement filter of claim 25 wherein the ion conduction layer comprises methoxypolyethyleneoxide methacrylate and 2-bromonapthalene.

29. The contrast enhancement filter of claim 25 wherein the variable attenuation element has a visible light transmission that can be varied from about 35% to 75%.

30. The contrast enhancement filter of claim 21 wherein the second outer major surface is affixed to a display.

* * * * *